United States Patent
Yanagisawa et al.

(10) Patent No.: US 11,136,903 B2
(45) Date of Patent: Oct. 5, 2021

(54) STEAM TURBINE

(71) Applicant: Mitsubishi Hitachi Power Systems, Ltd., Yokohama (JP)

(72) Inventors: Shin Yanagisawa, Tokyo (JP); Makoto Kondo, Tokyo (JP); Katsuhisa Hamada, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 50 days.

(21) Appl. No.: 16/475,923

(22) PCT Filed: Feb. 26, 2018

(86) PCT No.: PCT/JP2018/006844
§ 371 (c)(1),
(2) Date: Jul. 3, 2019

(87) PCT Pub. No.: WO2018/155664
PCT Pub. Date: Aug. 30, 2018

(65) Prior Publication Data
US 2019/0345843 A1    Nov. 14, 2019

(30) Foreign Application Priority Data

Feb. 27, 2017  (JP) .............................. JP2017-034595

(51) Int. Cl.
*F01D 25/24* (2006.01)
*F01D 25/28* (2006.01)

(52) U.S. Cl.
CPC ............. *F01D 25/28* (2013.01); *F01D 25/24* (2013.01); *F05D 2220/31* (2013.01)

(58) Field of Classification Search
CPC .. F05D 2220/31; F05D 2240/14; F01D 25/24; F01D 25/243; F01D 25/28; F01D 5/026
See application file for complete search history.

(56) References Cited

U.S. PATENT DOCUMENTS

| 4,732,533 A | 3/1988 | Remberg et al. | |
| 5,032,068 A * | 7/1991 | Kurherr | F01C 1/20 |
| | | | 418/10 |

(Continued)

FOREIGN PATENT DOCUMENTS

| DE | 3522917 A1 | 1/1987 |
| JP | 59-162303 A | 9/1984 |
| JP | 4-262006 A | 9/1992 |
| JP | 6-081604 A | 3/1994 |

(Continued)

OTHER PUBLICATIONS

Office Action dated Jun. 9, 2020, issued in counterpart KR Application No. 10-2019-7017977, with English translation (9 pages).

(Continued)

*Primary Examiner* — Long T Tran
(74) *Attorney, Agent, or Firm* — Westerman, Hattori, Daniels & Adrian, LLP

(57) ABSTRACT

A steam turbine includes a rotor shaft, a casing disposed so as to cover the rotor shaft and having a shaft penetration part through which the rotor shaft passes, and a casing support extending axially toward an inner side of the casing through an outer surface of the casing at a periphery of the shaft penetration part and supporting the casing.

7 Claims, 4 Drawing Sheets

(56) References Cited

U.S. PATENT DOCUMENTS

| | | | |
|---|---|---|---|
| 5,104,289 A | 4/1992 | Moreci | |
| 2002/0197147 A1* | 12/2002 | Kawai | F16M 7/00 |
| | | | 415/1 |
| 2007/0189893 A1* | 8/2007 | Burdgick | F01D 25/246 |
| | | | 415/213.1 |
| 2008/0260529 A1* | 10/2008 | Kawakami | F01D 25/246 |
| | | | 415/209.3 |
| 2012/0039709 A1* | 2/2012 | Rauch | F01D 25/30 |
| | | | 415/213.1 |
| 2014/0334919 A1 | 11/2014 | Misawa | |
| 2015/0001814 A1* | 1/2015 | Roge | F01D 11/005 |
| | | | 277/637 |
| 2016/0032745 A1* | 2/2016 | Ahn | F01D 11/003 |
| | | | 415/170.1 |
| 2016/0146036 A1* | 5/2016 | Richter | F01D 25/24 |
| | | | 415/126 |
| 2016/0305287 A1* | 10/2016 | Honda | F01D 25/26 |
| 2017/0328238 A1 | 11/2017 | Otani et al. | |
| 2019/0078465 A1* | 3/2019 | Choi | F16C 17/02 |
| 2019/0186298 A1* | 6/2019 | Terada | F01D 25/246 |

FOREIGN PATENT DOCUMENTS

| | | |
|---|---|---|
| JP | 10-18806 A | 1/1998 |
| JP | 2007-9731 A | 1/2007 |
| JP | 2010-180778 A | 8/2010 |
| JP | 2010-270646 A | 12/2010 |
| JP | 2012-159051 A | 8/2012 |
| JP | 2013/148064 A | 8/2013 |
| JP | 2016-104975 A | 6/2016 |

OTHER PUBLICATIONS

International Search Report dated May 15, 2018, issued in counterpart Application No. PCT/JP2018/006844 (9 pages).

Notification Concerning Transmittal of Translation of the International Preliminary Report on Patentability (Form PCT/IB/338) issued in counterpart International Application No. PCT/JP2018/006844 dated Sep. 6, 2019 with Forms PCT/IB/373, PCT/ISA/237, and PCT/IB/326, with English translation (11 pages).

Office Action dated Dec. 9, 2020, issued in counterpart DE Application No. 11 2018 001 019.8. (7 pages).

* cited by examiner

STEAM TURBINE

TECHNICAL FIELD

The present disclosure relates to a steam turbine.

BACKGROUND ART

A casing accommodating a rotor of a steam turbine is occasionally supported by a projecting portion (curved leg) disposed on the casing.

For instance, Patent Document 1 discloses a turbine in which projecting portions (curved legs) disposed so as to project in the axial direction from both end portions of a lower-half casing of the casing are mounted on struts fixed to a foundation and support the casing. In this turbine, the surface of the casing including the projecting portions is covered with a thermal insulation member to reduce heat emitted from the casing to the outside.

CITATION LIST

Patent Literature

Patent Document 1: JP2007-9731A

SUMMARY

Problems to be Solved

During start and stop of a steam turbine, a turbine casing may deform, and a rotary part including the rotor may come close to a stationary part including the casing, which decreases a clearance therebetween. For this reason the clearance between the rotary part and the stationary part of the steam turbine may reach a pinch point, where the clearance is minimum, during start and stop.

For avoiding contact between the rotary part and the stationary part of the steam turbine at the pinch point, it is necessary to ensure a large initial clearance. However, the large initial clearance may increase the clearance at rated operation of the steam turbine more than necessary, which may cause reduction in performance of the steam turbine.

Therefore, it is desired to efficiently suppress vertical movement of the casing during start and stop of the steam turbine to prevent the reduction in performance of the steam turbine.

In view of the above, an object of at least one embodiment of the present invention is to provide a steam turbine whereby it is possible to suppress vertical movement of a casing during start and stop of the steam turbine.

Solution to the Problems (1) A steam turbine according to at least one embodiment of the present invention comprises: a rotor shaft; a casing disposed so as to cover the rotor shaft and having a shaft penetration part through which the rotor shaft passes; and a casing support extending axially toward an inner side of the casing through an outer surface of the casing at a periphery of the shaft penetration part and supporting the casing.

With the above configuration (1), since the casing support extends into the casing through the outer surface of the casing at the periphery of the shaft penetration part, it is possible to reduce a distance from a support point of the casing supported by the casing support to the casing in the axial direction. Thereby, it is possible to efficiently suppress vertical movement of the casing in accordance with deformation of the casing when the casing thermally deforms during start and stop of the steam turbine.

(2) In some embodiments, in the above configuration (1), a distal end portion of the casing support is inserted in a recess provided in the casing, and the casing is supported by the distal end portion of the casing support.

With the above configuration (2), since the distal end of the casing support is inserted into the recess of the casing, it is possible to further reduce the distance from the support point of the casing supported by the casing support to the casing in the axial direction. Accordingly, it is possible to efficiently suppress vertical movement of the casing in accordance with deformation of the casing during start and stop of the steam turbine.

(3) In some embodiments, in the above configuration (1) or (2), the casing support is disposed so as to form a clearance at least between the casing and a lower surface of a distal end portion of the casing support and between the casing and an axial end surface of the distal end portion of the casing support.

With the above configuration (3), since the lower surface and the axial end surface of the distal end portion of the casing support are not in contact with the casing, it is possible to suppress heat transfer between the casing and the casing support, improve the efficiency of the steam turbine, suppress thermal deformation of the casing during start and stop of the steam turbine, and suppress vertical movement of the casing due to thermal expansion of the casing support.

(4) In some embodiments, in any one of the above configurations (1) to (3), the casing includes: an upper half having an upper flange part; and a lower half having a lower flange part fastened to the upper flange part of the upper half, and in a plan view, at least a part of the casing support extends axially toward the inner side of the casing through the outer surface of the casing on a rotor shaft side of inner peripheral edges of the upper flange part and the lower flange part.

With the above configuration (4), since at least a part of the casing support is positioned on the rotor shaft side of the inner peripheral edges of the upper flange part and the lower flange part, it is possible to bring the support point of the casing supported by the casing support close to the rotor shaft, and it is possible to suppress vertical movement of the casing in accordance with deformation of the casing.

(5) In some embodiments, in any one of the above configurations (1) to (4), the casing includes: an upper half having an upper flange part; and a lower half having a lower flange part fastened to the upper flange part of the upper half, and in a plan view, the casing support extends axially toward the inner side of the casing through the outer surface of the casing on a rotor shaft side of outer peripheral edges of the upper flange part and the lower flange part.

With the above configuration (5), since the casing support is positioned on the rotor shaft side of the outer peripheral edges of the upper flange part and the lower flange part, it is possible to bring the support point of the casing supported by the casing support close to the rotor shaft, and it is possible to suppress vertical movement of the casing in accordance with deformation of the casing.

(6) In some embodiments, in any one of the above configurations (1) to (5), the steam turbine further comprises a casing support liner disposed between the casing support and the casing. An outer end surface of the casing support liner is positioned inside the casing axially away from the outer surface of the casing at the periphery of the shaft penetration part, and the casing support is configured to support the casing via the casing support liner.

With the above configuration (6), it is possible to bring the position of the support point of the casing supported by the casing support (position of the outer end surface of the casing support liner) close to the casing in the axial direction. Thereby, it is possible to efficiently suppress vertical movement of the casing in accordance with deformation of the casing during start and stop of the steam turbine.

Further, the casing support liner may be used as a liner for adjusting the vertical position of the casing at the time of attaching the casing.

(7) In some embodiments, in any one of the above configurations (1) to (6), the steam turbine further comprises a heat insulating member disposed between the casing support and the casing, and the casing support is configured to support the casing via the heat insulating member.

With the above configuration (7), since the heat insulating member is disposed between the casing support and the casing, it is possible to suppress heat transfer between the casing and the casing support, improve the efficiency of the steam turbine, suppress thermal deformation of the casing during start and stop of the steam turbine, and suppress vertical movement of the casing due to thermal expansion in a height direction of the casing support.

(8) In some embodiments, in any one of the above configurations (1) to (7), a surface of the casing supported directly or indirectly by the casing support from below is positioned at a same height as a horizontal separation surface of the casing.

With the above configuration (8), since the surface of the casing positioned at the same height as the horizontal separation surface of the casing is supported by the casing support from below, the support point of the casing supported by the casing support is positioned at substantially the same height as the center of the rotor shaft (so-called center support). Thus, it is possible to suppress vertical movement of the casing due to thermal deformation of the casing.

Advantageous Effects

According to at least one embodiment of the present invention, there is provided a steam turbine whereby it is possible to suppress vertical movement of a casing during start and stop of the steam turbine.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
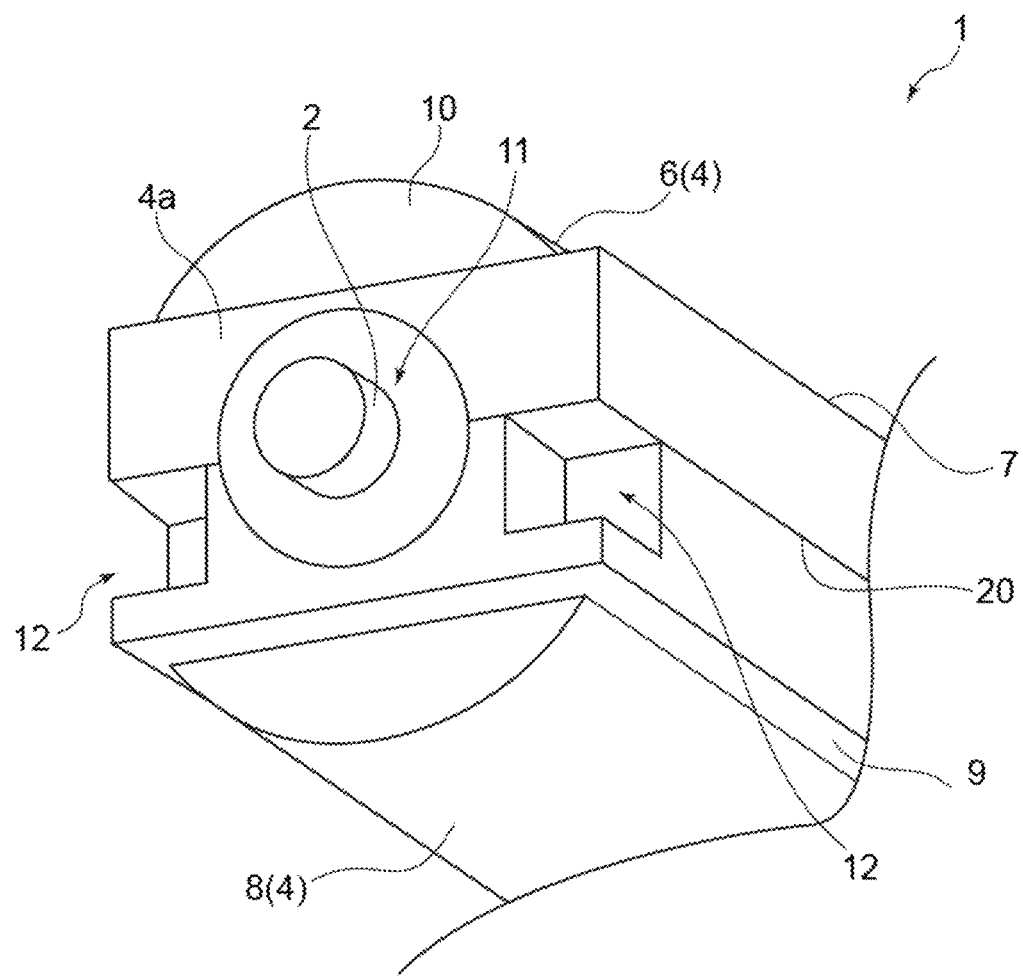
FIG. 1 is a partial perspective view of a schematic configuration of a steam turbine according to some embodiments.
Figure 2:
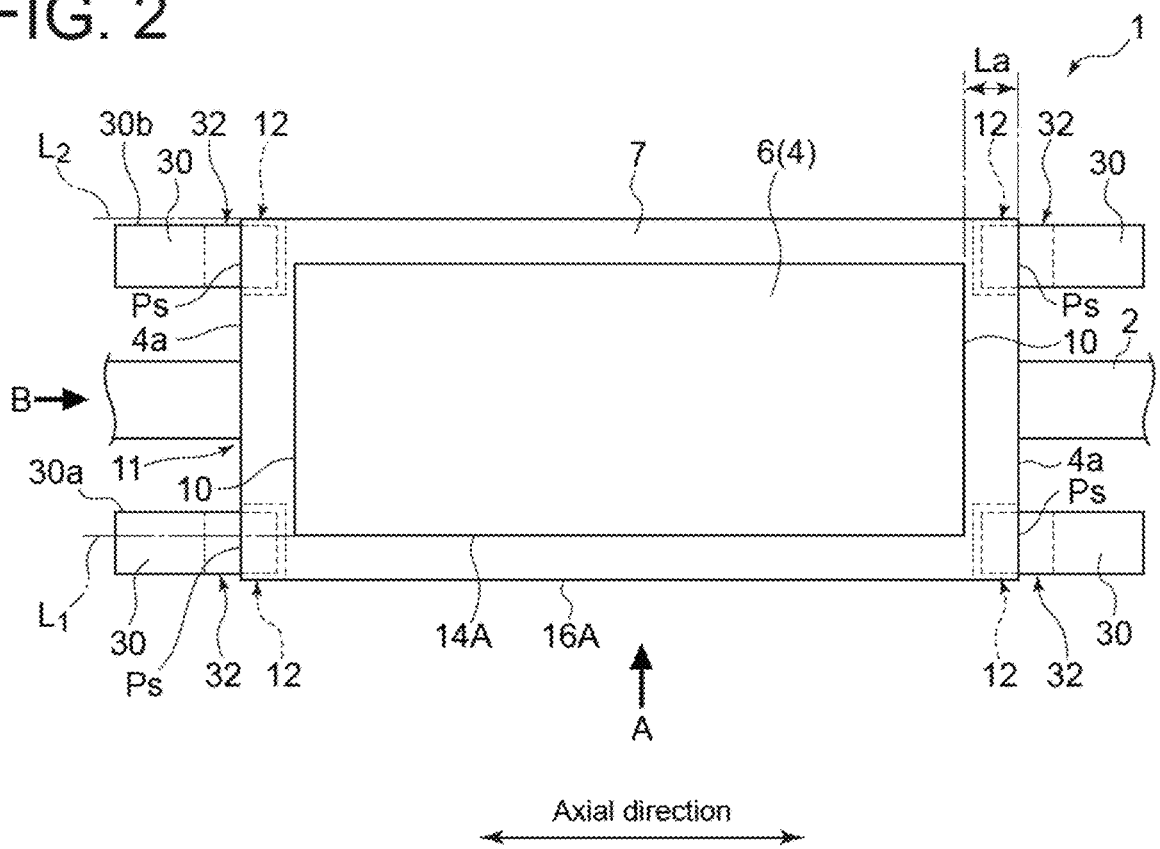
FIG. 2 is a plan view of the steam turbine shown in FIG. 1.
Figure 3:
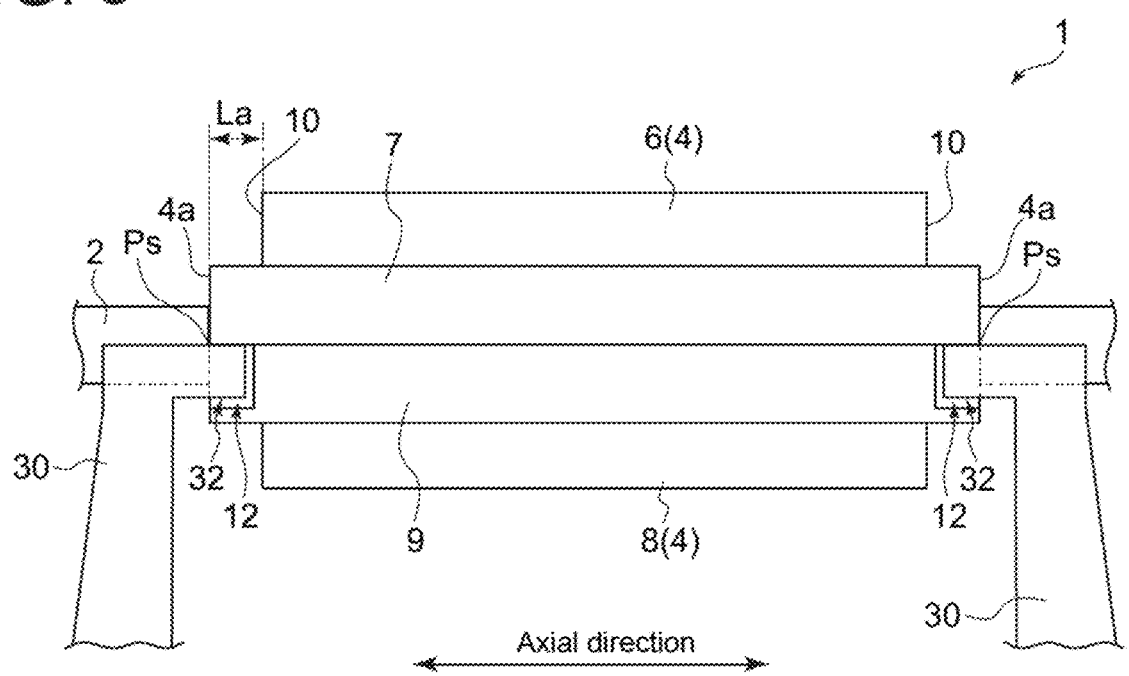
FIG. 3 is a view of the steam turbine shown in FIG. 2, as seen from the direction of arrow A.
Figure 4:
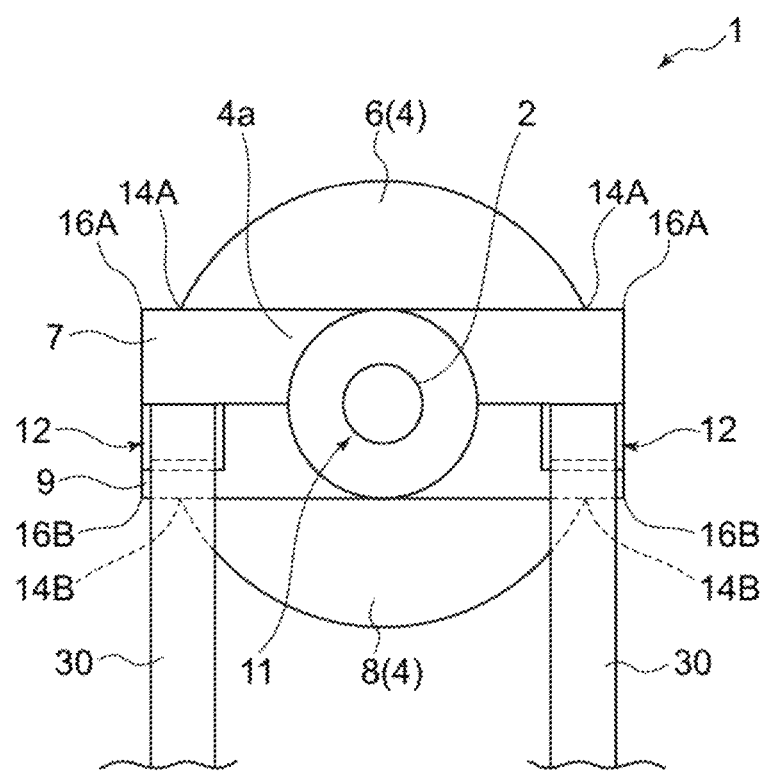
FIG. 4 is a view of the steam turbine shown in FIG. 2, as seen from the direction of arrow B.

FIG. 1 is a partial perspective view of a schematic configuration of a steam turbine according to some embodiments. FIG. 2 is a plan view of the steam turbine shown in FIG. 1. FIG. 3 is a view of the steam turbine shown in FIG. 2, as seen from the direction of arrow A. FIG. 4 is a view of the steam turbine shown in FIG. 2, as seen from the direction of arrow B. In FIG. 1, a casing support described later is not depicted for clarity. Further, in FIGS. 1 to 4, a pipe (e.g., pipe for supplying or discharging steam) connected to the casing is not depicted for clarity.

Figure 5:
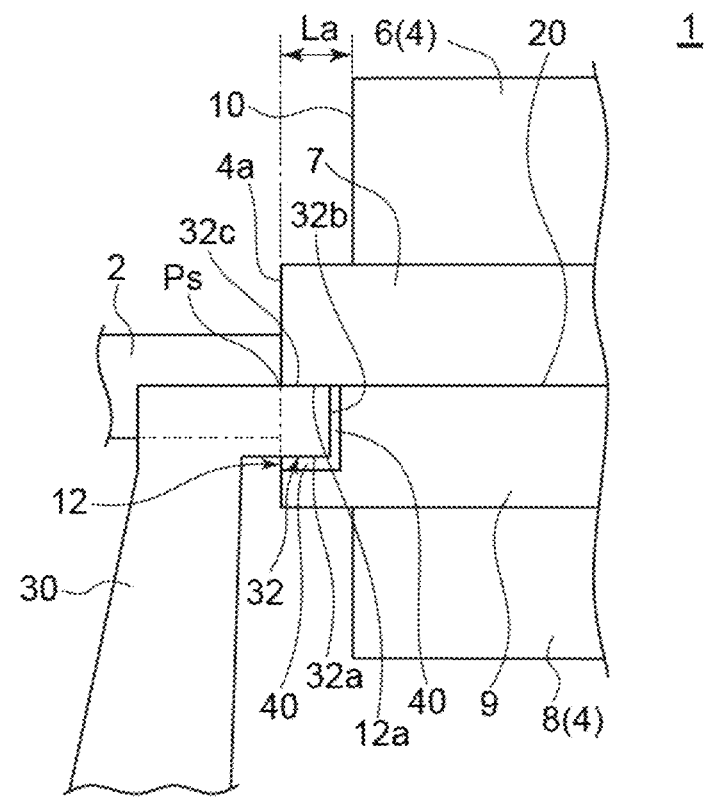
FIG. 5 is a view of a portion around a casing support of a steam turbine according to an embodiment.
Figure 6:
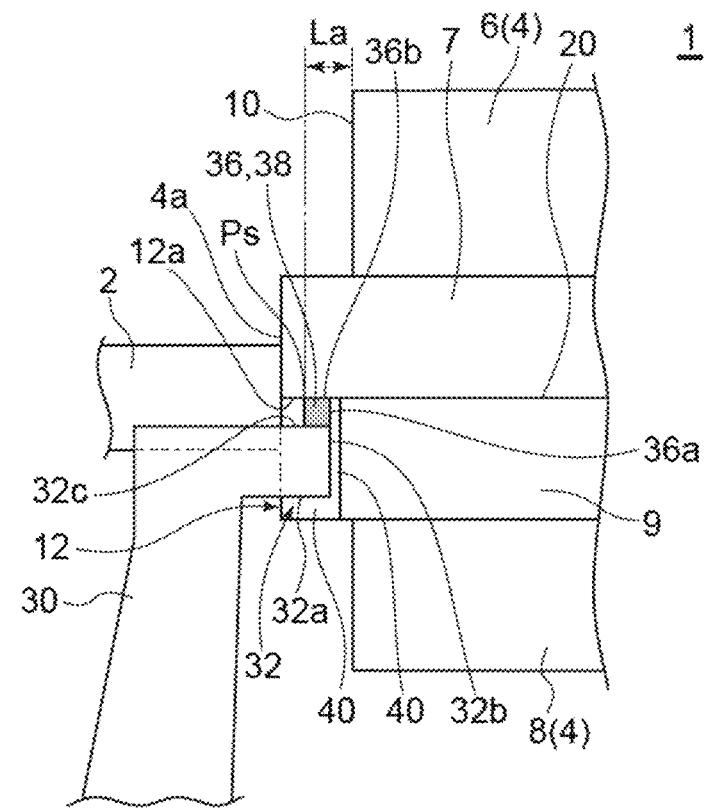
FIG. 6 is a view of a portion around a casing support of a steam turbine according to an embodiment.

FIGS. 5 and 6 each are a view of a portion around a casing support 30 of a steam turbine 1 according to an embodiment. FIG. 5 is a partial enlarged view of FIG. 3.

As shown in FIGS. 1 to 6, the steam turbine 1 includes a rotor shaft 2, a casing 4 disposed so as to cover the rotor shaft 2, and a casing support 30 (not shown in FIG. 1) supporting the casing 4. The casing 4 includes an end wall 10 positioned at an axial end portion and a shaft penetration part 11 through which the rotor shaft 2 passes.

A steam passage through which steam flows is provided in the casing 4. The casing 4 accommodates a plurality of blades disposed in the steam passage around the rotor shaft 2.

The casing 4 includes an upper half 6 positioned on the upper side and a lower half 8 positioned on the lower side, and the casing 4 is formed by fastening an upper flange part 7 disposed on the upper half 6 to a lower flange part 9 disposed on the lower half 8. Each of the upper flange part 7 and the lower flange part 9 may have a plurality of bolt holes (not shown), and the upper flange part 7 may be fastened to the lower flange part 9 by screwing a bolt (not shown) into each bolt hole.

The casing support 30 supporting the casing 4 extends toward the inner side of the casing 4 through an outer surface 4a of the casing 4 at the periphery of the shaft penetration part 11 in an axial direction of the rotor shaft 2 (herein, also simply referred to as "axial direction" or "axially").

In the steam turbine 1 according to the above embodiment, since the casing support 30 extends into the casing 4 through the outer surface 4a of the casing 4 at the periphery of the shaft penetration part 11, it is possible to reduce a distance La (see FIGS. 2, 3, 4, and 5) from a support point Ps at which the casing 4 is supported by the casing support 30 to the casing 4 in the axial direction. Thereby, it is possible to suppress vertical movement of the casing 4 in accordance with deformation of the casing 4.

In FIGS. 2, 3, 5, and 6, the distance La from the support point Ps at which the casing 4 is supported by the casing support 30 to the casing 4 in the axial direction indicates a distance between the support point Ps and the end wall 10 in the axial direction.

In some embodiments, as shown in FIGS. 1 to 6, the casing 4 has a recess 12 recessed axially inward from the outer surface 4a of the casing 4. Further, as shown in FIGS. 2 to 6, a distal end portion 32 of the casing support 30 is inserted in the recess 12 of the casing 4, and the casing 4 is supported by the distal end portion 32 of the casing support 30.

In the embodiments shown in FIGS. 1 to 6, the recess 12 is formed by a surface formed by cutting off an upper end portion of the lower half 8 of the casing 4 and a portion of a lower surface of the upper half 6 of the casing 4.

Further, as shown in FIGS. 2 to 5, an upper surface 32c of the distal end portion 32 of the casing support 30 is in contact with a lower surface 12a of the upper half 6 forming the recess 12, whereby the casing 4 is supported by the distal end portion 32 of the casing support 30.

In the embodiment shown in FIG. 6, as described later, the casing 4 is supported by the casing support 30 via a casing support liner 36 disposed between the casing 4 and the distal end portion 32 of the casing support 30 in the recess 12.

Thus, by inserting the distal end portion 32 of the casing support 30 into the recess 12 of the casing 4, it is possible to further reduce the distance La from the support point Ps of the casing 4 supported by the casing support 30 to the casing 4 in the axial direction. Accordingly, it is possible to efficiently suppress vertical movement of the casing 4 in accordance with deformation of the casing 4 during start and stop of the steam turbine 1.

In some embodiments, for instance as shown in FIGS. 5 and 6, the casing support 30 is disposed so as to form a clearance 40 at least between the casing 4 and the lower surface 32a of the distal end portion 32 of the casing support 30 and between the casing 4 and an axial end surface 32b of the distal end portion 32.

In this case, since the lower surface 32a and the axial end surface 32b of the distal end portion 32 of the casing support 30 are not in contact with the casing 4, it is possible to suppress heat transfer between the casing 4 and the casing support 30, improve the efficiency of the steam turbine 1, suppress thermal deformation of the casing 4 during start and stop of the steam turbine 1, and suppress vertical movement of the casing 4 due to thermal expansion of the casing support 30.

In some embodiments, in a plan view, at least a part of the casing support 30 extends axially toward the inner side of the casing 4 through the outer surface 4a of the casing 4 on a rotor shaft 2 side of inner peripheral edges 14A, 14B which are portions of the upper flange part 7 and the lower flange part 9 along the axial direction.

For instance, in an embodiment, as shown in FIG. 2, in a plan view, among end surfaces of the casing support 30 extending in the axial direction, an end surface 30a closer to the rotor shaft 2 is positioned on the rotor shaft 2 side of an extension line $L_1$ of the inner peripheral edges 14A, 14B of the upper flange part 7 and the lower flange part 9. Accordingly, a part of the casing support 30 (a portion on the rotor shaft 2 side of the extension line $L_1$) is positioned on the rotor shaft 2 side of the inner peripheral edges 14A, 14B of the upper flange part 7 and the lower flange part 9.

Thus, since at least a part of the casing support 30 is positioned on the rotor shaft 2 side of the inner peripheral edges 14A, 14B of the upper flange part 7 and the lower flange part 9, it is possible to bring the support point Ps of the casing 4 supported by the casing support 30 close to the rotor shaft 2, compared with the case where the casing support 30 is positioned on the opposite side of the inner peripheral edges 14A, 14B, opposite to the rotor shaft 2. Thereby, it is possible to suppress vertical movement of the casing 4 in accordance with deformation of the casing 4.

In some embodiments, in a plan view, the casing support 30 extends axially toward the inner side of the casing 4 through the outer surface 4a of the casing 4 on the rotor shaft 2 side of outer peripheral edges 16A, 16B which are portions of the upper flange part 7 and the lower flange part 9 along the axial direction.

For instance, in an embodiment, as shown in FIG. 2, in a plan view, among end surfaces of the casing support 30 extending in the axial direction, an end surface 30b further from the rotor shaft 2 is positioned on the rotor shaft 2 side of an extension line $L_2$ of the outer peripheral edges 16A, 16B of the upper flange part 7 and the lower flange part 9. Accordingly, the whole of the casing support 30 is positioned on the rotor shaft 2 side of the outer peripheral edges 16A, 16B of the upper flange part 7 and the lower flange part 9.

Thus, since the casing support 30 is positioned on the rotor shaft 2 side of the outer peripheral edges 16A, 16B of the upper flange part 7 and the lower flange part 9, it is possible to bring the support point Ps of the casing 4 supported by the casing support 30 close to the rotor shaft 2. Thereby it is possible to suppress vertical movement of the casing 4 in accordance with deformation of the casing 4.

In some embodiments, for instance as shown in FIG. 6, a casing support liner 36 is disposed between the casing support 30 and the casing 4, and an outer end surface 36a of the casing support liner 36 is positioned inside the casing 4 axially away from the outer surface 4a of the casing 4 at the periphery of the shaft penetration part 11. Further, the casing support 30 is configured to support the casing 4 via the casing support liner 36. The outer end surface 36a of the casing support liner 36 is an end surface positioned on an axially outer side of the casing 4 of end surfaces of the casing support liner 36.

In the illustrated embodiment shown in FIG. 6, the casing support liner 36 is disposed in the recess 12 between the upper surface 32c of the casing support 30 and the lower surface 12a of the upper half 6 forming the recess 12 of the casing 4. Further, an upper surface 36b of the casing support liner 36 is in contact with the lower surface 12a of the upper half 6 forming the recess 12, whereby the casing 4 is supported by the distal end portion 32 of the casing support 30 via the casing support liner 36.

Further, in the illustrated embodiment shown in FIG. 6, the outer end surface 36a of the casing support liner 36 is positioned inside the casing 4 a length $L_2$ axially away from the outer surface 4a of the casing 4 at the periphery of the shaft penetration part 11.

Thus, since the casing 4 is supported via the casing support liner 36 disposed between the casing support 30 and the casing 4, it is possible to bring the support point Ps (position of the outer end surface 36a of the casing support liner 36) of the casing by the casing support 30 close to the casing 4 in the axial direction.

Thereby, it is possible to efficiently suppress vertical movement of the casing 4 in accordance with deformation of the casing 4 during start and stop of the steam turbine 1.

Further, the casing support liner 36 may be used as a liner for adjusting the vertical position of the casing 4 at the time of attaching the casing 4.

In some embodiments, a heat insulating member 38 is disposed between the casing support 30 and the casing 4. Further, the casing support 30 is configured to support the casing 4 via the heat insulating member 38.

In some embodiments, the heat insulating member 38 may be the casing support liner 36 (see FIG. 6) disposed between the casing support 30 and the casing 4. Further, in some embodiments, the heat insulating member 38 may be a member different from the casing support liner 36.

Thus, since the heat insulating member 38 is disposed between the casing support 30 and the casing 4, it is possible to suppress heat transfer between the casing 4 and the casing support 30, improve the efficiency of the steam turbine 1, suppress thermal deformation of the casing 4 during start and stop of the steam turbine 1, and suppress vertical movement of the casing 4 due to thermal expansion in a height direction of the casing support 30.

In some embodiments, a surface of the casing 4 supported directly or indirectly by the casing support 30 from below is positioned at the same height as a horizontal separation surface 20 of the casing 4. Herein, the horizontal separation surface 20 indicates a surface along which an upper portion and a lower portion of the casing 4 are separated along the horizontal direction.

In some embodiments, for instance as shown in FIGS. 1 and 3 to 6, the horizontal separation surface 20 may be an interface at which the upper half 6 and the lower half 8 of the casing 4 are bonded. Alternatively, the horizontal separation surface 20 may be a bonded interface between the upper flange part 7 of the upper half 6 and the lower flange part 9 of the lower half 8.

In the illustrated embodiment shown in FIGS. 3 to 5, the casing 4 is supported directly by the casing support 30 from below at the lower surface 12a of the upper half 6 forming the recess 12. Further, in the embodiment shown in FIG. 6, the casing 4 is supported indirectly by the casing support 30 from below via the casing support liner 36 at the lower surface 12a of the upper half 6 forming the recess 12.

Thus, by supporting the surface (e.g., the lower surface 12a of the upper half 6 forming the recess 12) of the casing 4 positioned at the same height as the horizontal separation surface 20 of the casing 4 by the casing support 30 from below, the support point Ps of the casing 4 supported by the casing support 30 is positioned at substantially the same height as the center of the rotor shaft 2 (so-called center support). Thus, it is possible to suppress vertical movement of the casing 4 due to thermal deformation of the casing 4.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

REFERENCE SIGNS LIST

1 Steam turbine
2 Rotor shaft
4 Casing
4a Outer surface
6 Upper half
7 Upper flange part
8 Lower half
9 Lower flange part
10 End wall
11 Shaft penetration part
12 Recess
12a Lower surface
14A Inner peripheral edge
14B Inner peripheral edge
16A Outer peripheral edge
16B Outer peripheral edge
20 Horizontal separation surface
30 Casing support
30a End surface
30b End surface
32 Distal end portion
32a Lower surface
32b Axial end surface
32c Upper surface
36 Casing support liner
36a Outer end surface
36b Upper surface
38 Heat insulating member
40 Clearance
Ps Support point

The invention claimed is:

1. A steam turbine comprising:
a rotor shaft;
a casing disposed so as to cover the rotor shaft and having a shaft penetration part through which the rotor shaft passes; and
a casing support extending axially toward an inner side of the casing through an outer surface of the casing at a periphery of the shaft penetration part and supporting the casing,
wherein the casing includes an upper half and a lower half, the lower half being disposed below the upper half,
wherein a distal end portion of the casing support is inserted in a recess provided in the casing, the recess being recessed axially inward from the outer surface of the casing,
wherein the recess is formed partially by a part of a lower surface of the upper half, and wherein the casing is supported by the distal end portion of the casing support via an upper surface of the distal end portion and via the part of the lower surface of the upper half.

2. The steam turbine according to claim 1,
wherein the upper half has an upper flange part,
wherein the lower half has a lower flange part fastened to the upper flange part of the upper half, and
wherein, in a plan view, at least a part of the casing support extends axially toward the inner side of the casing through the outer surface of the casing on a rotor shaft side of inner peripheral edges of the upper flange part and the lower flange part.

3. The steam turbine according to claim 1,
wherein the upper half has an upper flange part,
wherein the lower half has a lower flange part fastened to the upper flange part of the upper half, and
wherein, in a plan view, the casing support extends axially toward the inner side of the casing through the outer surface of the casing on a rotor shaft side of outer peripheral edges of the upper flange part and the lower flange part.

4. The steam turbine according to claim 1, further comprising a casing support liner disposed between the casing support and the casing, wherein an outer end surface of the casing support liner is positioned inside the casing axially away from the outer surface of the casing at the periphery of the shaft penetration part, and wherein the casing support is configured to support the casing via the casing support liner.

5. The steam turbine according to claim 1, further comprising a heat insulating member disposed between the casing support and the casing, wherein the casing support is configured to support the casing via the heat insulating member.

6. The steam turbine according to claim 1, wherein a surface of the casing supported directly or indirectly by the casing support from below is positioned at a same height as a horizontal separation surface of the casing.

7. A steam turbine comprising:

a rotor shaft;

a casing disposed so as to cover the rotor shaft and having a shaft penetration part through which the rotor shaft passes; and a casing support extending axially toward an inner side of the casing through an outer surface of the casing at a periphery of the shaft penetration part and supporting the casing, wherein the casing includes an upper half and a lower half, the lower half being disposed below the upper half, wherein the casing support is disposed such that an upper surface of a distal end portion is in contact with a lower surface of the upper half, wherein the casing is supported by the distal end portion via the upper surface of the distal end portion, and wherein the casing support is disposed so as to form a clearance at least between the casing and a lower surface of the distal end portion of the casing support and between the casing and an axial end surface of the distal end portion of the casing support.

* * * * *